May 11, 1965  L. E. PULKOWNIK ETAL  3,182,562
VEHICLE BRAKE MECHANISM
Filed Nov. 1, 1962  3 Sheets-Sheet 2

INVENTORS
LAWRENCE E. PULKOWNIK
DAVID T. AYERS JR.
BY
ATTORNEY

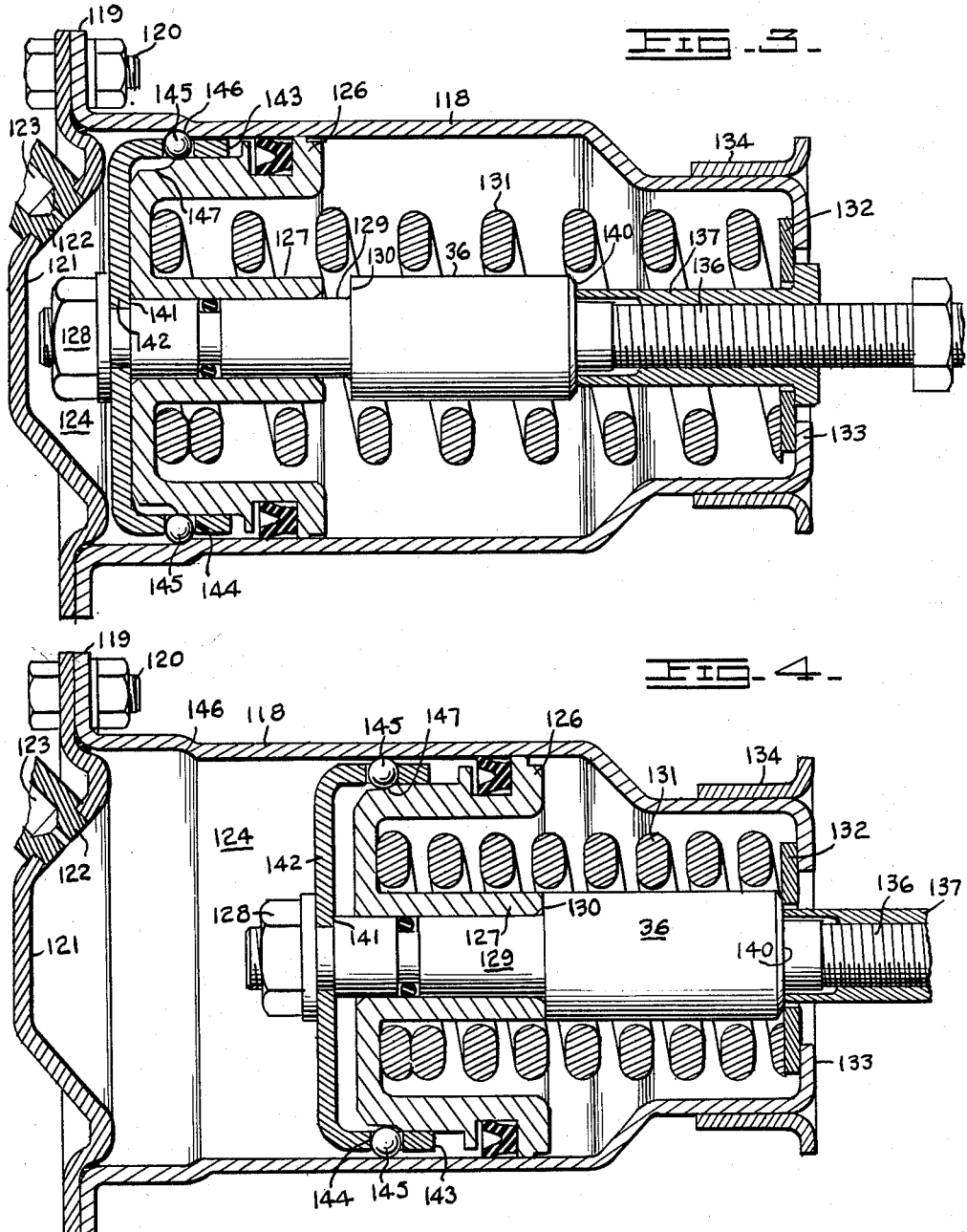

3,182,562
VEHICLE BRAKE MECHANISM
Lawrence E. Pulkownik, Plymouth, and David T. Ayers,
Jr., Birmingham, Mich., assignors to Kelsey-Hayes
Company, Romulus, Mich., a corporation of Delaware
Filed Nov. 1, 1962, Ser. No. 234,744
15 Claims. (Cl. 91—391)

This invention relates to a vehicle brake mechanism and is an improvement in a number of ways over the structures shown in the co-pending applications of David T. Ayers, Jr., Serial No. 181,409, filed March 21, 1962, now Patent No. 3,120,155; and Serial No. 221,851, filed September 6, 1962, now Patent No. 3,120,156.

As distinguished from booster brake mechanisms, wherein part of the work is performed by a booster motor and part by a vehicle operator in applying pressure to a brake pedal, there have been developed full power-brake mechanisms wherein a fluid pressure motor provides all of the force for applying the vehicle brakes. The operator is called upon to move the brake pedal only a sufficient distance necessary for operating the valve mechanism for the motor, while means is provided for reacting against the brake pedal to provide the latter with "feel" reaction. Because of the very limited necessary travel of the brake pedal with such a mechanism, the pedal pad may be arranged close to the toe board of the vehicle. This does not permit sufficient pedal travel for the manual application of the brakes in the event of a power failure. In present types of power-brake mechanisms, therefore, for example, in the co-pending applications referred to, it is proposed to provide means operable upon a failure of power for the brake-applying motor to elevate the brake pedal to a higher normal position and for establishing mechanical connection between the pedal and the master cylinder for the manual operation of the brakes.

In previous constructions, for example, in co-pending application 221,851, referred to above, a spring is arranged co-axially with the motor and is held compressed so long as pressure is present in the source for operating the brakes. When pressure fails, the spring is released and moves the pedal to a higher position, from which it is operable about a fixed pivot point, to manually apply the brakes. In such prior mechanisms, the presence of the pedal-elevating spring referred to, coaxially of the brake-operating motor, made it difficult and in some cases impossible to install the mechanism in a motor vehicle because of the lack of space.

An important object of the present construction is to provide a mechanism of the general character referred to, wherein the unit can be made much shorter longitudinally of the motor, to permit a much wider range of installation flexibility in the area of the vehicle where space limitations are usually quite critical.

A further object is to provide a mechanism of this character wherein the motor and the pedal "pop-up" mechanism are arraanged offset from each other laterally of their axes, thus economizing on the space necessary for its installation and permitting such installation to take place in vehicles which do not have the available space to accept longer brake-operating units.

A further object is to provide such mechanism wherein it is unnecessary, as in prior mechanisms, to use the pedal "pop-up" spring for locking the pedal relative to the master cylinder plunger, thus simplifying the construction.

A further object is to provide such a pedal-operating mechanism wherein, instead of moving the pedal to a higher position by applying spring force thereto at the pivot point from which valve-operating or manual forces are applied from the pedal, the pivotal support for the pedal is moved forwardly upon a failure of power for the motor, thus elevating the lower end of the pedal to position it for manual operation of the brakes.

A further object is to provide a highly improved form of device for moving the brake pedal from a normally power-operated position to a higher position for manual operation of the brakes by employing spring means connected to the pivotal support for the brake pedal, the spring being normally compressed when motor-operating pressure is present in the source, the spring being released upon a pressure failure in the source or a reduction in such pressure to a predetermined point, to move the pivotal support for the brake pedal forwardly of the vehicle and thus move the pedal pad rearwardly and upwardly for manual brake operation.

A further object is to provide a mechanism of the character referred to which is responsive to and operable upon a predetermined change in pressure in the source, and not necessarily to a complete faliure in source pressure, whereby the pedal is positioned for manual brake operation when the source pressure changes to the point where it is insufficient for a substantial brake operation.

Other objects and advantages of the invention will become apparent during the course of the following description.

In the drawings, we have shown one embodiment of the invention. In this showing:

FIGURE 3 is an axial sectional view through the brake-pedal moving or "pop-up" mechanism, the parts being shown in the positions they will assume when power fails;

FIGURE 4 is a similar view showing the normal positions of the parts when pressure is present in the source; and FIGURE 5 is a fragmentary sectional view on line 5—5 of FIGURE 1.

Figure 1:
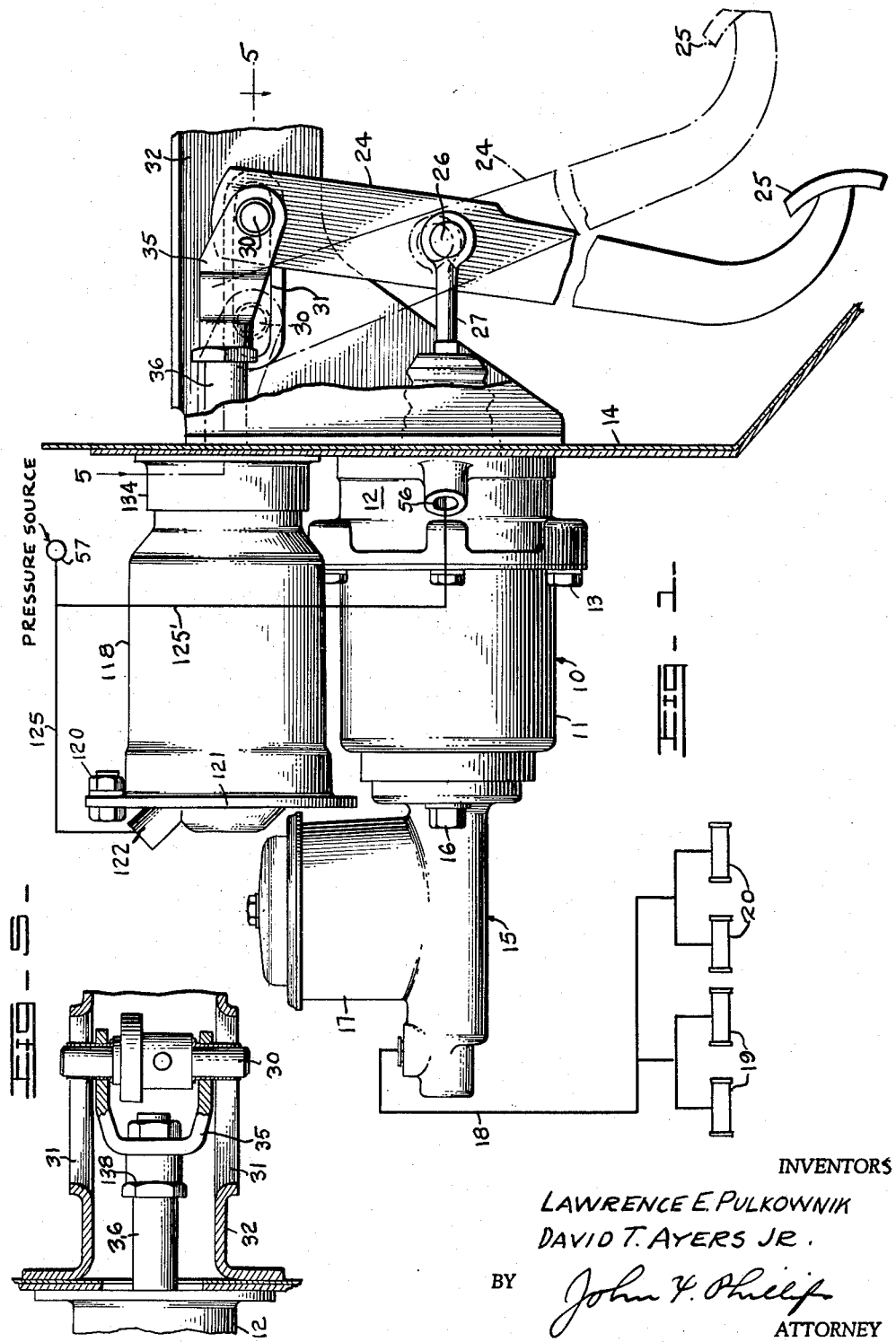
FIGURE 1 is a side elevation of the entire brake mechanism, parts of the supporting bracket and brake pedal being broken away and the vehicle fire wall being shown in section.

Referring to FIGURE 1, wherein the various parts of the mechanism are generally illustrated, the numeral 10 designates a fluid pressure brake-applying motor as a whole, comprising a motor cylinder 11, and a control housing 12 fixed to the rear end of the cylinder 11, as at 13, and fixed in any suitable manner to the vehicle fire wall 14. Means to be described is employed for utilizing the motor for operating the master cylinder 15 fixed to the cylinder 11 as at 16, and provided with the usual reservoir 17. The master cylinder, in accordance with conventional practice, is provided with fluid line 18 connected to the front-wheel brake cylinders 19 and the rear-wheel brake cylinders 20.

The mechanism is operable by a conventional brake pedal 24, having a pedal pad 25 at its lower end, and connected intermediate its ends by a pin 26, to a push rod 27, which is moved for operating the valve mechanism for the motor 10 and for delivering pedal forces to the master cylinder plunger in a manner to be described. The upper end of the pedal 24 is supported for pivotal movement by a pivot pin 30, operable in slots 31 (FIG. 5) formed in the arms of a bracket 32 fixed to the fire wall 14. The pivot pin 30 is normally arranged in the forward ends of the slots 31 for the power operation of the brakes, in which case the pedal 24 and its pad 25 occupy the normal positions shown in solid lines in FIGURE 1. A yoke 35 is connected to the pivot pin 30, as shown in FIGURE 5, and the base of the yoke is suitably connected to a rod 36 controlled as described below, in accordance with whether proper pressure is present in the source to be described. Upon a failure of or reduction to a predetermined point in source pressure, the rod 36 is moved forwardly to impart similar movement to the pivot pin 30, such pin moving forwardly in the slots 31. Under such conditions, the yoke 35 and pedal 24 occupy the broken-line positions shown in FIGURE 1, the lower end of the pedal being moved to a higher position from which the brakes will be fully pedal-operable.

Figure 2:
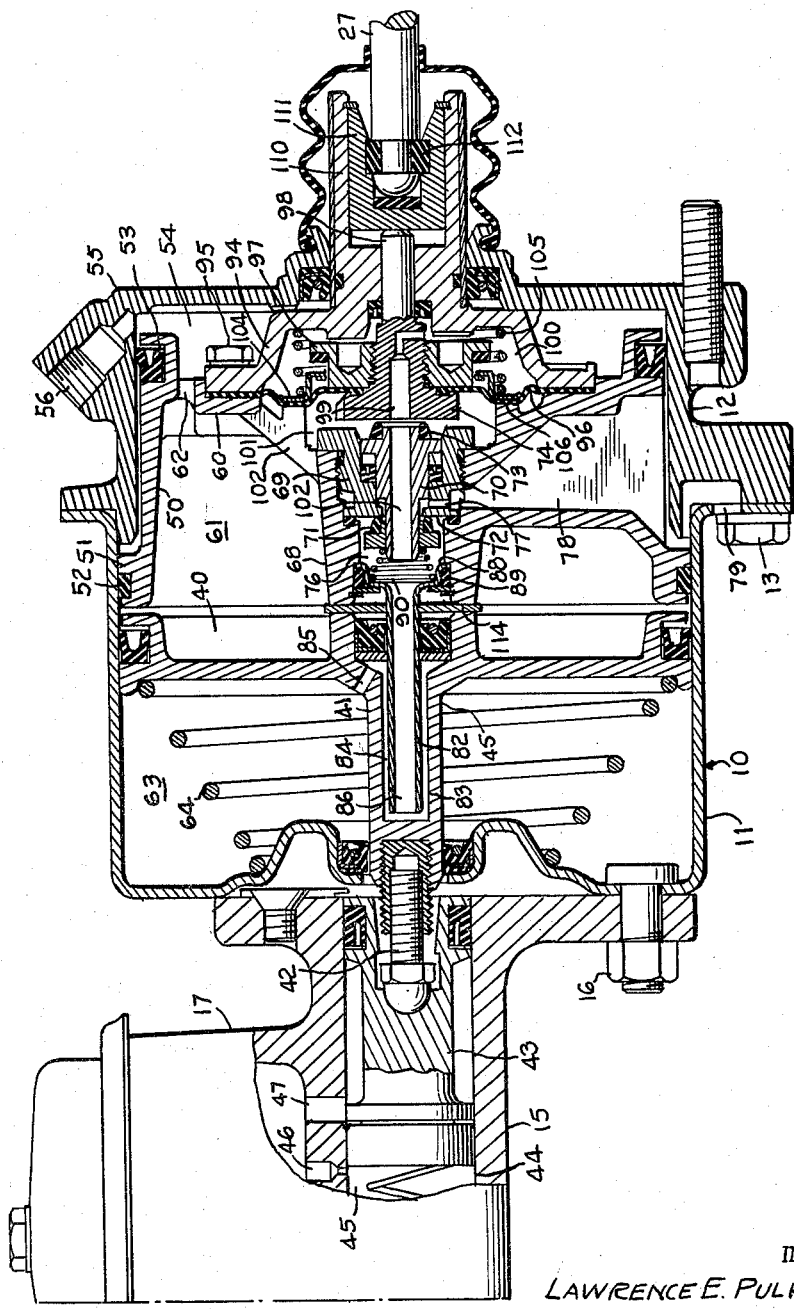
FIGURE 2 is an axial sectional view through the brake-applying motor and a portion of the master cylinder, the parts being shown in normal positions.

The motor 10 and associated elements are shown in FIGURE 2. Within the cylinder 11 is arranged a pressure-responsive unit shown in the form of a piston 40 having a forwardly-extending axial portion 41, connected as at 42, to the plunger 43 of the master cylinder. Such cylinder is provided with a bore 44 in which the plunger 43 is operable to displace fluid from a pressure chamber 45 to the brake lines 18. The reservoir 17 is provided with the usual ports 46 and 47 for supplying fluid to the bore 44, the port 46 being the usual replenishing port.

An axially movable structure 50 has a flange 51 at its forward end sealed as at 52 for sliding movement in the cylinder 11. The rear end of this structure is sealed as at 53 for sliding movement in the housing 12. Rearwardly of the structure 50 a chamber 54 is formed between such structure and a rear head 55 carried by the housing 12. The chamber 54 communicates through a port 56 with a source of pressure 57, in the present instance, superatmospheric pressure, further referred to below. This port is shown out of position in FIGURE 2 for the purpose of illustration and is shown in true position in FIGURE 1.

The structure 50 is provided with a wall 60 and between such wall and the piston 40 is formed a motor chamber 61 in constant communication with the source of pressure through a port 62 formed in the wall 60.

The forward end of the cylinder 11 forms with the piston 40 a variable pressure chamber 63, normally subject to pressure in the source as described below, and relieving of pressure in the chamber 63 results in forward movement of the piston 40 to operate the master cylinder plunger 43. A return spring 64 biases the piston 40 to its normal off position.

The axially-movable structure 50 is provided with a hub portion 68 in which most of the valve mechanism for the motor 10 is housed. A nut 69 is mounted in the hub 68 and a valve body 70 is slidable in this nut. The forward end of the valve body 70 carries a resilient valve element 71 engageable with the forward end 72 of the nut 69, serving as a valve seat. The rear end of the valve body 70 carries a valve element 73 normally disengaged from a valve seat 74, further described below.

Outwardly of the valve 71 a chamber 76 is formed in the hub 68 and upon opening of the valve 71, the chamber 76 communicates through port 77 with a radial air-passage 78 cast in the structure 50 and open to the atmosphere as at 79.

A tube 82 projects through a bore 83 in the axial portion 41 of the piston and between this bore and the tube 82 is formed an annular passage 84 communicating with the chamber 63 through a port 85. The tube provides a passage 86 therethrough communicating at its forward end with the passage 84 and at its rear end with the chamber 76. The rear end of the tube 82 is flared as at 88 and sealed as at 89 with respect to the hub 68. Spring 90 biases the valve body rearwardly and normally maintains the valve 71 closed.

A plate 94 is fixed as at 95 to the wall 60 and this wall and the plate 94 have secured therebetween the peripheral portion of a diaphragm 96. The valve seat 74 is formed as a head having a substantial forward surface. Rearwardly of this head is arranged a nut 97. The inner periphery of the diaphragm 96 is clamped between the head 74 and nut 97.

The head 74 is formed integral with a rearwardly extending stem 98, having a passage 99 communicating at its rear end with a chamber 100 formed between the diaphragm 96 and plate 94. The diaphragm 96 forms with the structure 50, a chamber 101, and the structure 50 is cut away as at 102 to communicate with the motor chamber 61. The chamber 101 therefore is always subject to pressure from the source through chamber 61, port 62 and chamber 54. The chambers 76 and 101 normally communicate with each other through an axial passage 102 in the valve body 70.

The diaphragm 96 is backed up by a ferrule 104, urged forwardly by a spring 105 to tend to maintain the diaphragm in engagement with an annular flange 106 formed integral with the structure 50.

The plate 94 is provided with a rearwardly extending axially bored portion 110 in which is slidable a head 111, connected as at 112 to the forward end of the rod 27. The head 110 engages the rear end of the stem 98 so that initial movement of the head 110 operates the valve mechanism, as described below. It will be noted that limited movement or lost motion is provided between the head 74 and the rear end of the nut 69. When pressure in the source fails, or drops as described below, this lost motion is taken up and pedal forces are directly applied through nut 69 to the axially movable structure 50, to transmit movement to the piston 40, and thus operate the master cylinder plunger 43. Such movement is preferably transmitted through a washer 114 arranged between the hub 68 and the adjacent portion of the piston 40.

The mechanism for changing the position of the pedal 24 is shown in FIGURES 3 and 4. Above the motor 10 is arranged a casing 118 flanged at its forward end as at 119, for connection as at 120 to a head 121, having an inlet 122 fixed thereto and providing a port 123 connected to the pressure source 57 for the motor through a line 125, and opening into a chamber 124 in the casing 118. A branch line 125' connects the line 125 to the port 56.

It will be understood that the particular type of pressure source is immaterial. For example, if the source is super-atmospheric pressure, it will be practicable to use an engine-driven compressor, preferably supplying air at super-atmospheric pressure to a suitable storage tank.

The forward end portion of the housing 118 constitutes a cylinder in which is arranged a piston 126 having a hub portion 127 through which the forward end of the rod 36 projects, this rod being provided at its forward end with a nut 128. The rod 36 is provided with a reduced forward end 129 forming a shoulder 130 normally engaging the rear end of the hub 127. A relatively heavy spring 131 surrounds the rod 36 and engages at opposite ends against the piston 126 and a washer 132, engaging against a forward inturned flange 133 formed integral with the housing 118. The reduced rear end of this housing is surrounded by an attaching flange 134, welded thereto and seated against and secured in any suitable manner, to the fire wall 14.

The rear end of the rod 36 is reduced as at 136 and on which is threaded a sleeve 137, the rear flanged end of which engages the washer 132. The rear end of the reduced rod portion 136 is connected to the yoke 35. The forward end of the sleeve 137 engages against a shoulder 140 formed at the forward end of the reduced rod portion 136. The sleeve 137 forms a threaded axial adjusting means for the rod 36.

The forward end of the rod 36 is shouldered as at 141 to receive a plate 142 fixed in position by the nut 128. The plate 142 is provided with a radially outer flange 143 having a circumferential series of openings 144 receiving balls 145. When the spring 131 is expanded as shown in FIGURE 3, the balls 145 engage behind an annular shoulder 146, formed in the cylinder 118. These balls, under normal conditions, are arranged against the inner surface of the cylinder 118 (FIGURE 4) and have their inner portions arranged in an annular recess 147 formed around the piston 126.

*Operation*

The parts normally occupy the positions shown in solid lines in FIGURE 1, and in FIGURES 2 and 4. Assuming that proper pressure is present in the source, such pressure will be communicated to the chamber 124, and since atmospheric pressure is present to the right of the piston 126, such piston will occupy the position shown in FIGURE 4. The shoulder 140 will engage the washer 132 and the rod 36 will be pushed to its right-hand limit, holding the pivot pin 30 near the right-hand ends of the slots 31. Under such conditions, the pedal 24 will occupy the solid-line position shown in FIGURE 1.

The brake pedal will occupy a power-operable position from which it need be only slightly moved to operate the motor 10. Movement of the pedal clockwise and to a slight extent from the position shown in solid lines in FIGURE 1, will transmit movement from the pin 26 through rod 27, head 111 and stem 98, to move the left-hand face of the head 74 into engagement with the valve 73. This operation closes the passage 102 and disconnects the chamber 76 from the pressure chamber 101. Slight further movement of the brake pedal causes the head 74 to move the valve body 70 to the left in FIGURE 2, to unseat the valve 71. This operation opens the chamber 76, through port 77, to the atmospheric passage 78, thus venting the motor chamber 63 to the atmosphere. Pressure being always present in the motor chamber 61, the piston 40 will move to the left in FIGURE 2 to similarly move the master cylinder plunger 43, thus displacing fluid from the chamber 45 to the brake cylinders.

The degree of differential pressures in the chambers 61 and 63 will depend upon valve operation by the brake pedal. The piston 40 is normally pressure-suspended and the operator controls pressure in the chamber 63 by controlling the exhausting of pressure from the chamber 63 through the cracking of the valve 71. It will be noted that when the valve elements are in normal position, source pressure is supplied to the chamber 100 from the chamber 101 through passage 99. As soon as the valve 73 is closed, the chambers 100 and 101 are disconnected from each other and pressure in the motor chamber 63 will be duplicated in the chamber 100 through passages 102 and 99. When pressure drops in the chamber 63, therefore, differential pressures affecting the elements 74 and 97 react against the brake pedal through the rod 27 to provide the pedal with "feel" reaction. This apprises the operator of the degree of brake application in initial stages of brake operation as described above.

It is desirable to provide increased reaction when the brakes are applied to a greater extent. When pressure drops in the chamber 100 to a predetermined point, due to exhaustion of pressure from the motor chamber 63, pressure in the chamber 101 will overcome the spring 105, thus moving the ferrule 104 to the right in FIGURE 2 to its limit of movement relative to the nut 97. Pressure acting to the right against the diaphragm 96 will now be added to the pressure acting to the right against the head 74 to provide a second higher stage of reaction. Through the feel of the brake pedal the operator may determine the degree of brake application and may slightly ease off on the brake pedal to allow the spring 90 to return the valve 71 to closed position when the desired brake application has been attained.

It will be apparent that with pressure present in the source and with the parts of the motor in the off position shown in FIGURE 2, the structure 50 will be substantially pressure-unbalanced. It will be noted that the larger diameter of the flange 51 as compared with the opposite end of the structure 50 provided with the seal 53, subjects the structure 50 to a greater pressure to the right in FIGURE 2, thus tending to hold the structure 50 in its normal position. It also will be noted that the valve elements are normally pressure suspended.

When the motor is operated in the manner described and pressure drops in the motor chamber 63, there will be a corresponding drop in pressure in the diaphragm chamber 100, which drop will not be to atmospheric pressure except in the case of a power "run-out," that is, when the motor is energized to its maximum extent. For ordinary brake applications, substantial pressure may be retained in the chamber 100, which will be exposed to pressure in the motor chamber 63. Such retained pressure acts in opposite directions in the chamber 100 while pressure in the chamber 61 acts against the diaphragm 96 to cause pedal reaction. This reaction will be absorbed by the operator's foot and pressure in the chamber 100 will act against the left-facing surfaces of such chamber. Such pressure, added to pressure in the motor chamber 61 acting against the wall 60, will result in a net pressure acting to the right relative to the structure 50 to maintain the latter biased to its normal position.

If pressure drops below the predetermined point at which the mechanism in FIGURES 3 and 4 becomes operative, as described below, the net pressure acting to the right against the structure 50 will be so reduced as not to offer any serious opposition to pedal operation of the master cylinder plunger.

The parts are immediately returned to normal positions when the brake pedal is released. Under such conditions pressure in the chamber 101 moves the head 74 to its off position, while the spring 90 returns the valves 71 and 73 to normal positions, the valve 71 closing and limiting movement of the valve 73 to an open position relative to the head 74. Thus the motor chamber 63 will again be connected to the pressure chamber 101 to balance pressures in the motor chambers 61 and 63, whereupon the return spring 64 returns the piston 40 to its normal inoperative position in FIGURE 2.

In prior constructions employing cylinder ends connected together at their peripheries, for example, the cylinder sections 11 and 12 held together by the screws 13, it has been necessary to provide a seal between such cylinder sections. This is unnecessary in the present case since the space radially outwardly of the structure 50, between the seals 52 and 53 remains at all times at atmospheric pressure, such space communicating with the atmosphere through the port 79.

During all of the foregoing operations, the pivot pin 30 for brake pedal 24 will have remained stationary, thus constituting a fixed pivot for the brake pedal under normal conditions. The pin 30 is maintained in such position by pressure in the chamber 124 (FIGURE 4) with the shoulder 140 seating against the washer 132 to limit movement of the pin 30 to the right in FIGURE 1.

Assuming that pressure in the source should fail, or drop below a predetermined point, it is desirable to provide for the foot application of the brakes with a pedal leverage the same as, or comparable to, the leverage provided in conventionally operated brakes. Under such conditions, there will be a drop in pressure in the chamber 124, whereupon the spring 131 expands to move the piston 126 to the position shown in FIGURE 3. It will be noted that when the spring 131 is compressed during normal power operation, there is a space provided between plate 142 (FIGURE 4) and the adjacent end of the piston 126. Under such conditions, the balls 145 will engage the inner surface of the cylinder 118 and will have their inner portions arranged in the groove 147. Expansion of the spring 131, upon a pressure failure, moves the piston 126 and plate 142 to the left, and when the balls move into positions at the shoulder 146, further movement of the piston 126 causes the groove 147 to cam the balls 145 outwardly as shown in FIGURE 3. Movement of the plate 142 is limited by engagement of the sleeve 137 with washer 132, thus providing for said further movement of the piston 126 relative to the plate 142.

When such positions of the piston 126 and associated elements are reached, the pin 30 will have reached the broken-line position shown in FIGURE 1, and the pin 30 will be firmly held in such position upon the locking of the balls 145 back of the shoulder 146. The spring 131 will maintain the locked position of the balls 145 and assist the balls in holding the rod 36 against movement.

The brake pedal 24 will now occupy the broken-line position shown in FIGURE 1. The pin 26 will not have been appreciably moved, and the moving of the pin 30 to the left in FIGURE 1 will have moved the lower end of the brake pedal to the right so that it assumes a position in which there is ample pedal travel for the foot operation of the brakes. The pedal leverage will be comparable to conventional pedal-operated brake mechanisms and the operator may apply the brakes by foot pressure with much less force than is required with present booster brake mechanisms wherein insufficient pedal leverage is provided.

With the parts in the pedal-operable positions referred to, operation of the brake pedal transmits force as before to the head 74, to move this head to the left. The valve 73 will be slightly deformed and the head 74 will engage solidly against the nut 69, thus moving the structure 50 to the left, with the seals 52 and 53 sliding in the cylinder 11 and housing 12. Such movement of the structure 50 then moves the piston 40 to the left under pedal pressure to effect pedal operation of the master cylinder 15 to displace fluid from the chamber 45 to apply the brakes.

Reference has been made above to the functioning of the structure in FIGURES 3 and 4 if pressure in the source fails completely or drops to a predetermined point. A ruptured pressure line, of course, will result in a complete failure in source pressure. However, it is possible that due to malfunctioning of the compressor or leakage in the pressure lines, the source pressure may drop, but not below the point at which it is operative for a substantial brake application. It is desirable to utilize the source pressure for power brake operation so long as such pressure is sufficient upon full energization of the motor 10 to develop a master cylinder pressure of, for example, 400 p.s.i. Therefore, the structure in FIGURES 3 and 4, and particularly the spring 131, is so designed that the locking balls 145 do not register with and engage the shoulder 146 unless and until source pressure drops to a point where the motor 10 is inoperative for developing a predetermined master cylinder pressure such as 400 p.s.i. as stated above. If pressure in the source drops below such point, then the locking balls 145 become engaged with the shoulder 146 and thereafter the present mechanism becomes operative only for pedal operation of the brakes unless pressure in the source is restored.

As distinguished from the prior constructions referred to, the present pedal "pop-up" mechanism does not affect the motor structure in any way. In normal operation of the motor 10, movement of the head 74 operates the valve mechanism for the full power operation of the brakes without transmitting force to the nut 69 to move the structure 50. In manual operation of the brakes, only very slight additional movement of the head 74 is necessary for the pedal operation of the brakes. Since air for operating the motor is supplied to the chamber 54 and through port 62 to the chamber 61, pressures are balanced on opposite sides of the structure 50 except as described above.

As distinguished from the prior constructions referred to, there is no movement transmitted to the pin 26 when the pressure fails. Prior constructions move such pin to the right to raise the pedal to the normal higher pedal-operable position. Also, in such prior constructions it was necessary to lock the pin 26 relative to the internal structure employed for transmitting pedal forces to the motor piston, upon movement of the pedal "pop-up" mechanism.

It is also to be noted that the unit as a whole is much shorter longitudinally thereof than is true of the prior constructions, thus allowing installation of the unit where insufficient space is available with longer motor units employing the "pop-up" mechanism as a part thereof and arranged axially thereof. The means for moving the pedal to its higher position is offset above the motor, and instead of moving the pivot 26 to the right, the pedal pad is raised by moving the pivot pin 30 to the left upon a failure in power, and this pivot pin is firmly fixed in either of its two operation positions.

It is to be understood that the form of the invention shown and described is to be taken as a preferred example of the same and that various changes in the shape, size, and arrangement of the parts may be made as do not depart from the spirit of the invention or the scope of the appended claims.

We claim:

1. Fluid pressure motor mechanism comprising a motor having a casing and a pressure-movable unit therein, a valve mechanism operative for connecting said motor to a pressure source, a normally stationary axially movable member engageable with said pressure-movable unit, a lever, a pivotal support for said lever, a mechanical connection including lost motion between said axially movable member and said lever at a point spaced from said pivotal support, said mechanical conection engaging said valve mechanism to operate it upon movement of said lever from a first normal position, and means operative independently of said mechanical connection upon a drop in pressure in said source below a predetermined point for moving said pivotal support to and holding it in a different position with said lever moved to a different normal position from which it has greater movement to take up said lost motion and effect movement of said axially-movable member and said pressure-movable unit by force applied to said lever.

2. A fluid pressure motor mechanism comprising a motor having a casing and a pressure-movable unit therein, a valve mechanism operable for connecting said motor to a pressure source, a normally stationary axially movable member coaxial with and engageable with said pressure-movable unit, a lever, a pivotal support for said lever, a mechanical connection between said valve mechanism and said lever and including a push rod pivotally connected to said lever at a point spaced from said pivotal support, said mechanical connection having lost motion relative to said axially movable member within the limits of which said lever is movable from a first normal position to operate said valve mechanism, and means operative independently of said mechanical connection upon a drop in pressure in said source below a predetermined point for moving said pivotal support to and holding it in a different position with said lever moved to a second normal position from which it has greater movement to take up said lost motion and effect movement of said axially-movable member and said pressure-movable unit by force applied to said lever.

3. A motor mechanism according to claim 2, wherein said means comprises a spring having mechanical connection with said pivotal support, and means for utilizing pressure in said source for maintaining said spring compressed with said pivotal support holding said lever in said first normal position.

4. A motor mechanism according to claim 2, wherein said means comprises a cylinder, a piston in said cylinder defining with one end thereof a pressure chamber connected to said source, said piston being connected to said pivotal support, and a spring arranged in said cylinder between said piston and the other end of said cylinder, said spring being normally compressed by pressure in said chamber to hold said pivotal support in a position with said lever in said first normal position, said drop in pressure in said source releasing said spring to move said pivotal support to said different position.

5. A motor mechanism according to claim 2, wherein said means comprises a cylinder, a piston in said cylinder defining with one end thereof a pressure chamber connected to said source, and means engageable between said piston and said cylinder when said pivotal support is in said different position for tending to hold said piston against movement in said cylinder when pressure is applied to said lever when the latter is in said second normal position.

6. A fluid pressure motor mechanism comprising a motor having a casing and a pressure-responsive unit therein having pressure chambers at opposite sides thereof, an axially movable unit in said casing coaxial with said pressure-responsive unit and engaging such unit when the latter is in a normal off position, said axially movable unit having sealed engagement with said casing and forming one end of one of said pressure chambers, a valve mechanism having an element movable to effect the unbalancing of pressures in said pressure chambers to effect movement of said pressure-responsive unit away from said axially movable unit, a lever, a pivotal support for the said lever, a mechanical connection between said axially-movable member and said lever at a point spaced from said pivotal support, said mechanical connection engaging said element to operate it upon movement of said lever from a first normal position, and means operative upon a failure of said valve mechanism to substantially unbalance pressures in said pressure chambers for moving said pivotal support to and holding it in a different position with said lever moved to a second normal position from which it has greater movement to effect movement of said axially-movable member and said pressure-responsive unit by force applied to said lever.

7. A fluid pressure motor mechanism comprising a motor having a casing and a pressure-responsive unit therein, a normally stationary axially-movable member normally engaging said pressure-responsive unit, a source of pressure, a valve mechanism connected to said source and normally balancing pressures on opposite sides of said pressure-responsive unit and comprising a normally closed valve and a normally open valve, a lever, a pivotal support for said lever, mechanical means connecting said valves to said lever at a point spaced from said pivotal support and operable by said lever for opening said normally closed valve and closing said normally open valve for establishing differential pressures in said motor to move said pressure-responsive unit, said mechanical means having lost-motion connection with said axially-movable member, and means arranged laterally offset from and independent of said motor and connected to said pivotal support and operative independently of said mechanical means for moving said pivotal support and holding it in a different position with said lever moved to a different position from which it has greater movement to take up said lost motion connection and effect movement of said mechanical means and said pressure-responsive unit if operation of said valve mechanism fails to establish substantial differential pressures in said motor.

8. A motor mechanism according to claim 7, wherein said means for moving said pivotal support comprises a spring tending to move said pivotal support to said differential position, and means for utilizing pressure supplied to said motor for normally holding said spring compressed and inoperative.

9. A motor mechanism according to claim 7, wherein said means for moving said pivotal support comprises a casing, a pressure-responsive member therein forming therewith a chamber connected to said source and mechanically connected to said pivotal support and utilizing pressure in said source for maintaining said pivotal support in a normal position, and a spring normally compressed by said pressure-responsive member and operative upon a failure of said valve mechanism to establish said substantial differential pressures in said motor to move said pivotal support to said different position.

10. A motor mechanism according to claim 7, provided with a pressure source for said motor and wherein said means for moving said pivotal support comprises a casing, a pressure-responsive member therein forming therewith a chamber connected to said source and mechanically connected to said pivotal support and utilizing pressure in said source for maintaining said pivotal support in a normal position, a spring normally compressed by said pressure-responsive member and operative upon a failure of said valve mechanism to establish said substantial differential pressures in said motor, to move said pivotal support to said different position, and means operative when said pivotal support reaches said different position for tending to hold said pressure-responsive member against movement in said casing when force is applied to said lever.

11. A motor mechanism according to claim 7, provided with a pressure source for said motor and wherein said means for moving said pivotal support comprises a casing, a pressure-responsive member therein forming therewith a chamber connected to said source and mechanically connected to said pivotal support and utilizing pressure in said source for maintaining said pivotal support in a normal position, a spring normally compressed by said pressure-responsive member and operative upon a drop of pressure in said source below a predetermined point for moving said pressure-responsive member to move said pivotal support to said different position, said casing being provided with a shoulder facing away from said pivotal support, locking means carried by said pressure-responsive member, and means for engaging said locking means with said shoulder when said pivotal support reaches said other position for tending to prevent movement of said pressure-responsive member when force is applied to said lever.

12. A fluid pressure motor mechanism comprising a motor having a pressure-responsive unit therein forming with said casing a pressure chamber, a normally stationary axially-movable member within said casing at the side of said pressure-responsive unit opposite said chamber and forming with said pressure-responsive unit a second chamber, a valve mechanism normally balancing pressures in said chambers, a source of pressure connected to said valve mechanism, a lever, a pivotal support for said lever offset from the axis of said motor, a lost-motion mechanical connection between said axially-movable member and said lever at a point spaced from said pivotal support, said mechanical connection operating said valve mechanism upon movement of said lever to unbalance pressures in said chambers to move said pressure-responsive member, and means offset from the axis of and independent of said motor and connected to said pivotal support for tending to maintain the latter in a normal position and operative upon a drop in pressure in said source below a predetermined point for moving said support to and holding it in a different position with said lever moved to a different position from which it has greater movement to take up said lost motion and to effect movement of said axially movable member and said pressure-responsive unit by force applied to said lever.

13. A fluid pressure motor mechanism comprising a motor having a pressure-responsive unit therein forming with said casing a pressure chamber, a normally stationary axially-movable member within said casing at the side of said pressure-responsive unit opposite said chamber and forming with said pressure-responsive unit a second chamber, a valve mechanism normally balancing pressures in said chambers, a source of pressure connected to said valve mechanism, a lever, a pivotal support for said lever offset from the axis of said motor, a mechanical connection including lost motion between said axially-movable member and said lever at a point spaced from said pivotal support, said mechanical connection operating said valve mechanism upon movement of said lever to unbalance pressures in said chambers to move said pressure-responsive member, and means offset from the axis of said motor for controlling the position of said pivotal support, such means comprising a pressure-responsive member subject to pressure in said source and connected to said pivotal support for maintaining the latter in a normal position when pressure is present in said source, and means for moving said pressure-responsive member upon a drop in pressure in said source below a predetermined point for moving said pivotal support to a different position with said lever moved to a different position from which it has greater movement to take up said lost motion and for moving said axially-movable member and said pressure-responsive unit by force applied to said lever.

14. A fluid pressure motor mechanism comprising a motor having a pressure-responsive unit therein forming with said casing a pressure chamber, a normally stationary axially-movable member within said casing at the side of said pressure-responsive unit opposite said chamber and forming with said pressure-responsive unit a second chamber, a valve mechanism normally balancing pressures in said chambers and connected to a source of pressure, a lever, a pivotal support for said lever offset from the axis of said motor, a mechanical connection including lost motion between said axially-movable member and said lever at a point spaced from said pivotal support, said mechanical connection operating said valve mechanism upon movement of said lever to unbalance pressures in said chambers, a housing having an axis substantially parallel to and offset from the axis of said motor, a pressure-responsive member in said housing connected to said pivotal support and subject to pressure in said source to be maintained in a given position by such pressure to hold said pivotal support in a normal position, and spring means engaging said pressure-responsive member and normally compressed by source pressure acting thereon, whereby upon a drop in pressure in said source below a predetermined point, said spring is released to move said pivotal support to move said lever to a different position from which it has greater movement to take up said lost motion and move said axially-movable member and said pressure-responsive unit by force applied to said lever.

15. A motor mechanism according to claim 14 provided with means normally inoperative when pressure is present in said source and arranged to be operative by said spring when the latter expands and said pivotal support is moved, for locking said pressure-responsive member and said pivotal support against force applied to said lever.

References Cited by the Examiner
UNITED STATES PATENTS

| | | | |
|---|---|---|---|
| 2,706,020 | 4/55 | Freers et al. | 188—152.44 |
| 2,755,891 | 7/56 | Levell et al. | 188—152.44 |
| 2,848,980 | 8/58 | Ayers | 121—38 |
| 2,910,147 | 10/59 | Fishtahler et al. | 188—152.44 |
| 2,959,011 | 11/60 | Randal | 121—41 |
| 2,980,066 | 4/61 | Stelzer et al. | 121—41 |
| 3,063,427 | 11/62 | Hill | 121—41 |
| 3,067,727 | 12/62 | Ayers et al. | 60—54.5 |

FRED E. ENGELTHALER, *Primary Examiner.*

RICHARD WILKINSON, *Examiner.*